(12) United States Patent
Dai et al.

(10) Patent No.: US 11,939,508 B2
(45) Date of Patent: Mar. 26, 2024

(54) POLYMERIZABLE COMPOUND, PREPARATION METHOD THEREFOR, AND USE THEREOF

(71) Applicant: BEIJING BAYI SPACE LCD TECHNOLOGY CO., LTD., Beijing (CN)

(72) Inventors: Xiong Dai, Beijing (CN); Kun Jiang, Beijing (CN); Pei Xie, Beijing (CN); Haiwei Zhang, Beijing (CN); Jianbo Sun, Beijing (CN); Youwen Cheng, Beijing (CN); Bin Hou, Beijing (CN); Yijie Tang, Beijing (CN)

(73) Assignee: BEIJING BAYI SPACE LCD TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/906,504

(22) PCT Filed: Dec. 1, 2020

(86) PCT No.: PCT/CN2020/133017
§ 371 (c)(1),
(2) Date: Sep. 16, 2022

(87) PCT Pub. No.: WO2021/189928
PCT Pub. Date: Sep. 30, 2021

(65) Prior Publication Data
US 2023/0142277 A1 May 11, 2023

(30) Foreign Application Priority Data
Mar. 24, 2020 (CN) .......................... 202010213733.9

(51) Int. Cl.
| | | |
|---|---|---|
| *G02F 1/1333* | (2006.01) | |
| *C09K 19/04* | (2006.01) | |
| *C09K 19/12* | (2006.01) | |
| *C09K 19/20* | (2006.01) | |

(52) U.S. Cl.
CPC .............. *C09K 19/12* (2013.01); *C09K 19/04* (2013.01); *C09K 19/20* (2013.01); *C09K 2019/0448* (2013.01); *C09K 2019/123* (2013.01)

(58) Field of Classification Search
CPC ........ C09K 19/12; C09K 19/04; C09K 19/20; C09K 19/38; C09K 19/3804; C09K 2019/0444; C09K 2019/0448; C09K 2019/123; G02F 1/1333
See application file for complete search history.

(56) References Cited

U.S. PATENT DOCUMENTS

2023/0142277 A1* 5/2023 Dai ........................ C09K 19/04
252/299.66

FOREIGN PATENT DOCUMENTS

WO 2020048946 A1 3/2020

OTHER PUBLICATIONS

International Search Report issued in International Application No. PCT/CN2020/133017; dated Mar. 8, 2021; 8 pgs.
Written Opinion of the International Searching Authority issued in International Application No. PCT/CN2020/133017; dated Mar. 8, 2021; 7 pgs.

* cited by examiner

*Primary Examiner* — Geraldina Visconti
(74) *Attorney, Agent, or Firm* — HAUPTMAN HAM, LLP

(57) ABSTRACT

The disclosure belongs to the technical field of liquid crystal materials, and specifically relates to a polymerizable compound, a preparation method therefor, and the use thereof. The polymerizable compound has a structure as shown in general formula I. Compared with the existing polymerizable RM, the polymerizable compound has the advantages of a good solubility, a faster polymerization rate, a more complete extent of polymerization, and less residues, thereby improving the problem of poor display to a great extent.

(I)

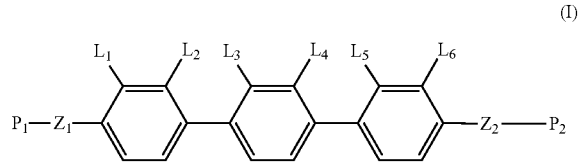

18 Claims, No Drawings

POLYMERIZABLE COMPOUND, PREPARATION METHOD THEREFOR, AND USE THEREOF

CROSS-REFERENCE TO RELATED APPLICATIONS

This application is a U.S. National Phase of International Application Number PCT/CN2020/133017, filed Dec. 1, 2020, and claims the priority of Chinese patent application No. 202010213733.9 entitled with "polymerizable compound, preparation method therefor, and use thereof" filed on Mar. 24, 2020, the entire disclosure of which is incorporated herein by reference in its entirety.

TECHNICAL FIELD

The present invention belongs to the technical field of liquid crystal materials, and specifically relates to a polymerizable compound, a preparation method therefor, and the use thereof.

BACKGROUND ART

In recent years, liquid crystal display devices are widely used in various electronic devices, such as a smart phone, a tablet computer, an automotive navigator, and a television. Representative liquid crystal display modes include twisted nematic (TN) type, super twisted nematic (STN) type, in-plane switching (IPS) type, fringe-field switching (FFS) type and vertical alignment (VA) type. Among them, the VA mode has received more and more attention due to its fast falling time, high contrast ratio, wide viewing angle and high-quality images. However, it also has its own shortcomings, for example, the residual image level of a VA mode display element is obviously worse than that of a positive dielectric anisotropic display element, and its response time is relatively slow and its driving voltage is relatively high.

A PSVA (polymer stabilized vertical alignment liquid crystal) type liquid crystal display element has a polymer structure formed in the liquid crystal cells to control the pretilt angle structure of liquid crystal molecules, and is used as a liquid crystal display element due to its high-speed response and high contrast ratio. The PSVA-type display element is manufactured by injecting a polymerizable composition comprising a liquid crystal compound and a polymerizable compound between substrates, followed by ultraviolet radiation and polymerization in a state where liquid crystal molecules are aligned.

However, the existing polymerizable RM has a poor solubility, and exhibits a slow polymerization rate and a relatively low polymerization degree when polymerized with a liquid crystal compound.

SUMMARY OF THE INVENTION

A first objective of the present invention is to provide a novel polymerizable compound. Compared with the existing polymerizable RM, the polymerizable compound of the present invention has the advantages of a good solubility, a faster polymerization rate, a more complete extent of polymerization, and less residues, thereby improving the problem of poor display to a great extent.

The polymerizable compound of the present invention has the following structure:

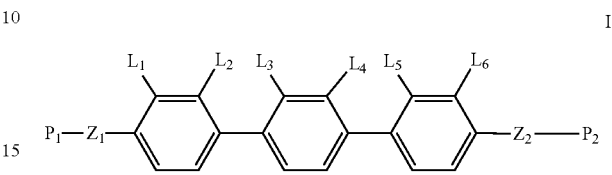

wherein the $P_1$ and $P_2$ each independently represent an acrylate group, a methacrylate group, a fluoroacrylate group, a chloroacrylate group, an ethyleneoxy group, an oxetanyl group, or an epoxy group;

the $Z_1$ and $Z_2$ each independently represent a single bond, —O—, —S—, —CO—, —CO—O—, —O—CO—, —O—CO—O—, —CH=N—, —N=CH—, —N=N—, a $C_1$-$C_{12}$ alkylene group, or a $C_2$-$C_{12}$ alkenyl group, wherein one or more hydrogen atoms in the $C_1$-$C_{12}$ alkylene group or the $C_2$-$C_{12}$ alkenyl group may each independently be substituted by F, Cl or CN, and one or more non-adjacent —CH$_2$— groups may each independently be replaced by —O—, —S—, —NH—, —CO—, COO—, —OCO—, —OCOO—, —SCO—, —COS— or —C=C— in a way that is not directly connected to each other;

$L_1$, $L_2$, $L_3$, $L_4$, $L_5$, and $L_6$ each independently represent H, —F, —Cl, —CH$_3$, —C$_2$H$_5$, —OCH$_3$, —OC$_2$H$_5$, —CF$_3$ or OCF$_3$; and $L_1$ and $L_2$ are not both H; $L_3$ and $L_4$ are not both H; $L_5$ and $L_6$ are not both H.

In general formula I, preferably, $P_1$ and $P_2$ each independently represent a methacrylate group, an acrylate group, a fluoroacrylate group or a chloroacrylate group; more preferably, $P_1$ and $P_2$ each independently represent a methacrylate group or an acrylate group.

In general formula I, preferably, $Z_1$ and $Z_2$ each independently represent a single bond, —O—, —S—, —CO—O—, —O—CO—, a $C_1$-$C_6$ alkylene group, or a $C_2$-$C_6$ alkenyl group, wherein one or more hydrogen atoms in the $C_1$-$C_6$ alkylene group or the $C_2$-$C_6$ alkenyl group may each independently be substituted by F, and one or more non-adjacent —CH$_2$— groups may each independently be replaced by —O— in a way that is not directly connected to each other; more preferably, $Z_1$ and $Z_2$ each independently represent a single bond, —O—, a $C_1$-$C_6$ alkylene group or alkoxy group.

In general formula I, preferably, $L_1$, $L_2$, $L_3$, $L_4$, $L_5$, and $L_6$ each independently represent —F, —CH$_3$, or —OCH$_3$.

In the present invention, preferably, the structure of the general formula I is:

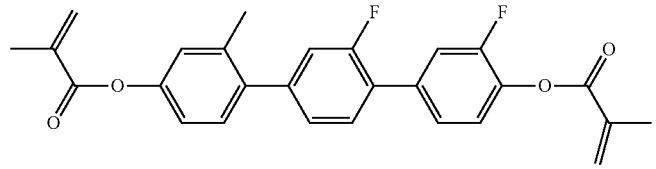

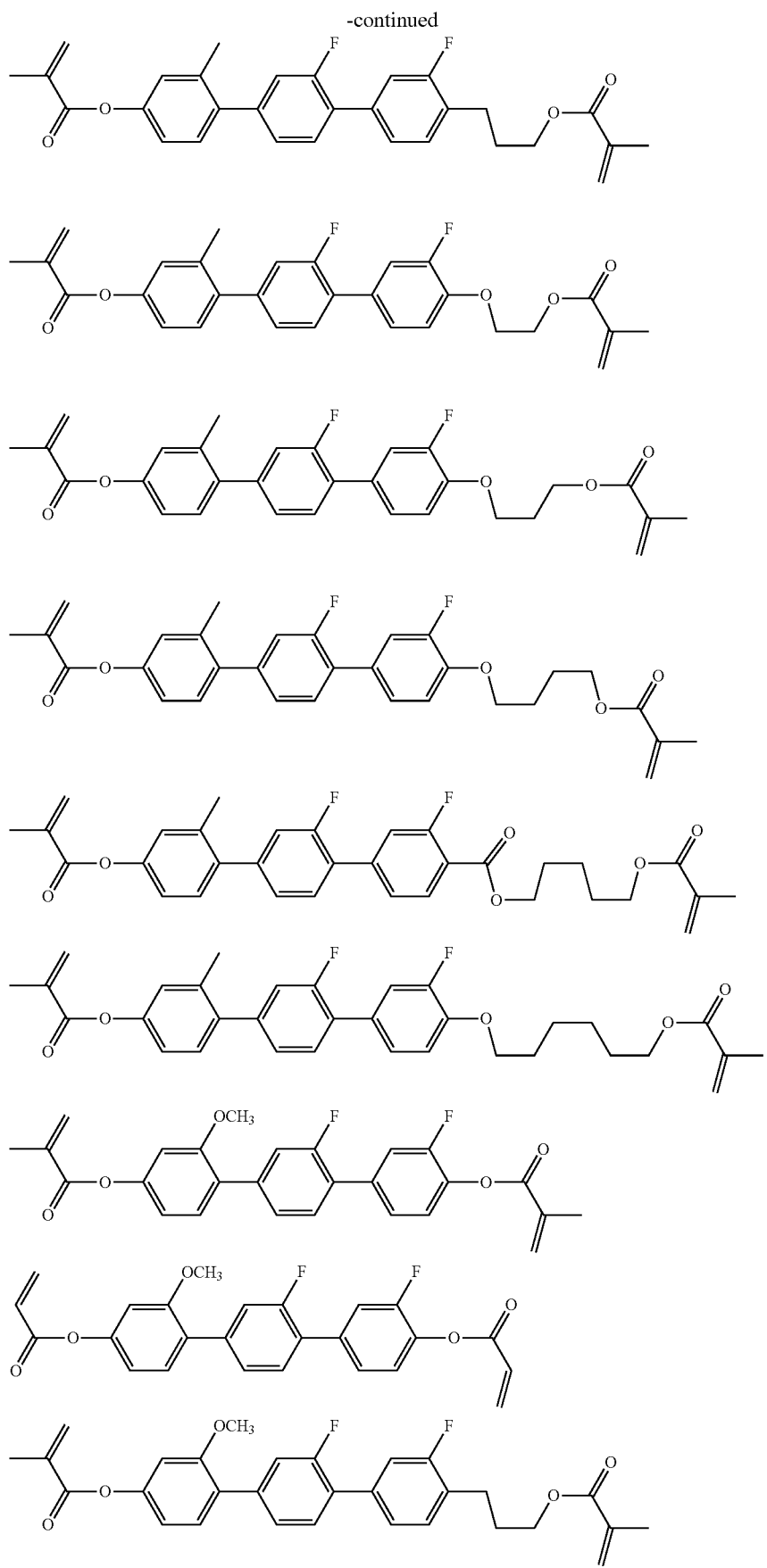

-continued
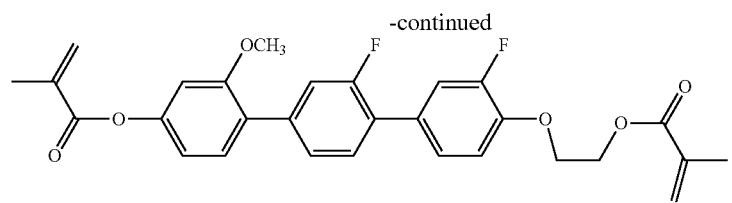
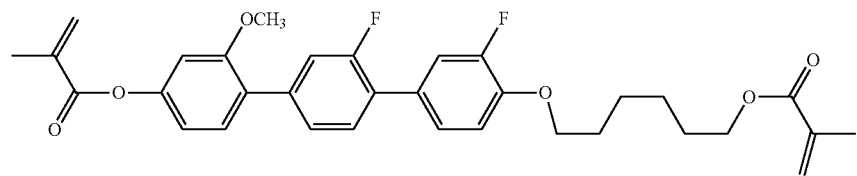
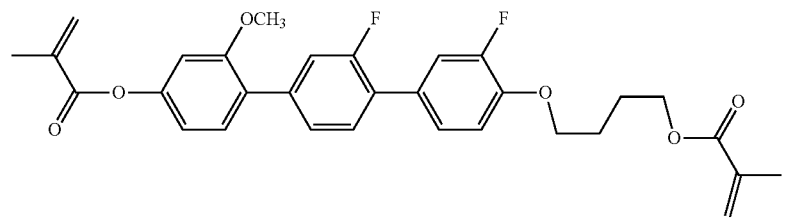
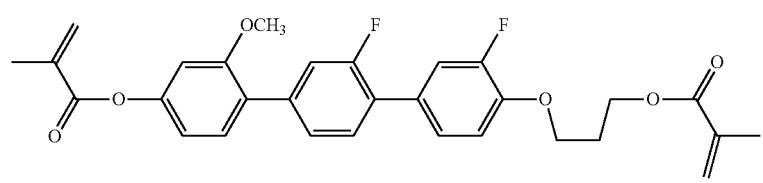
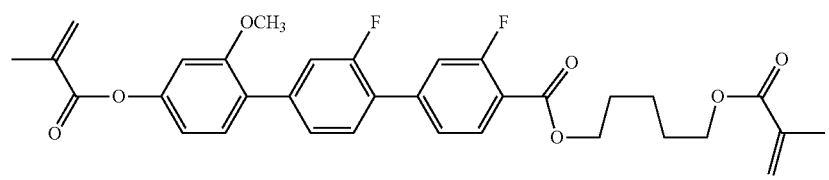
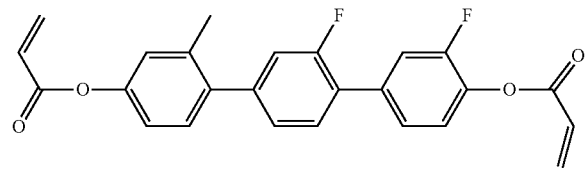
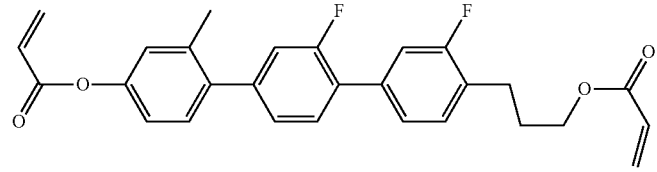
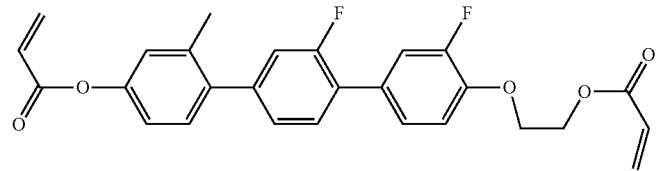
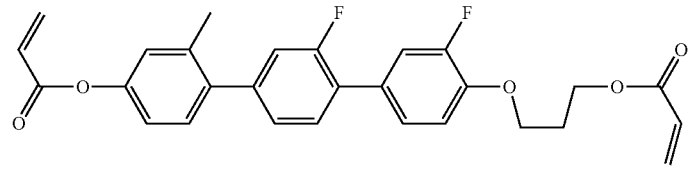

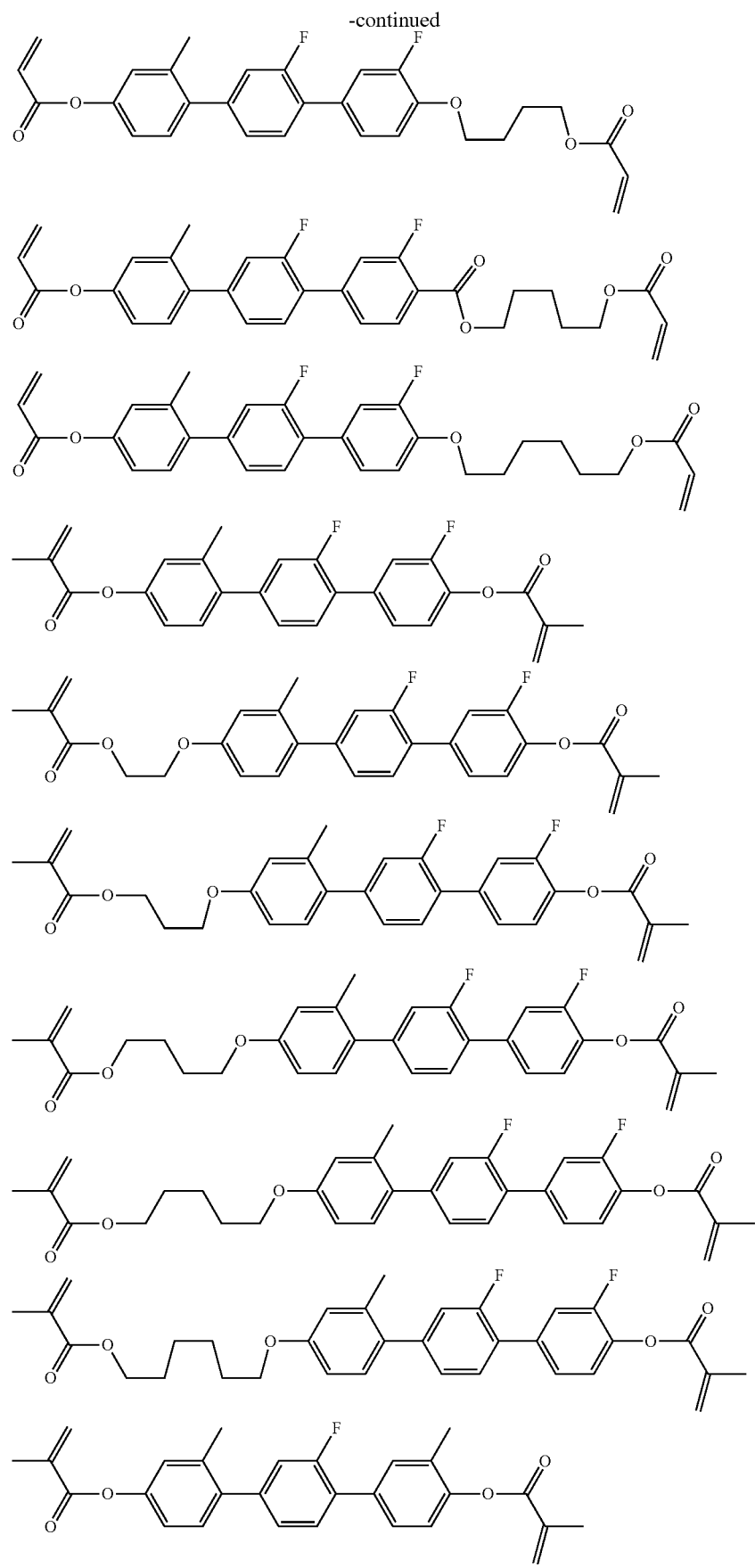

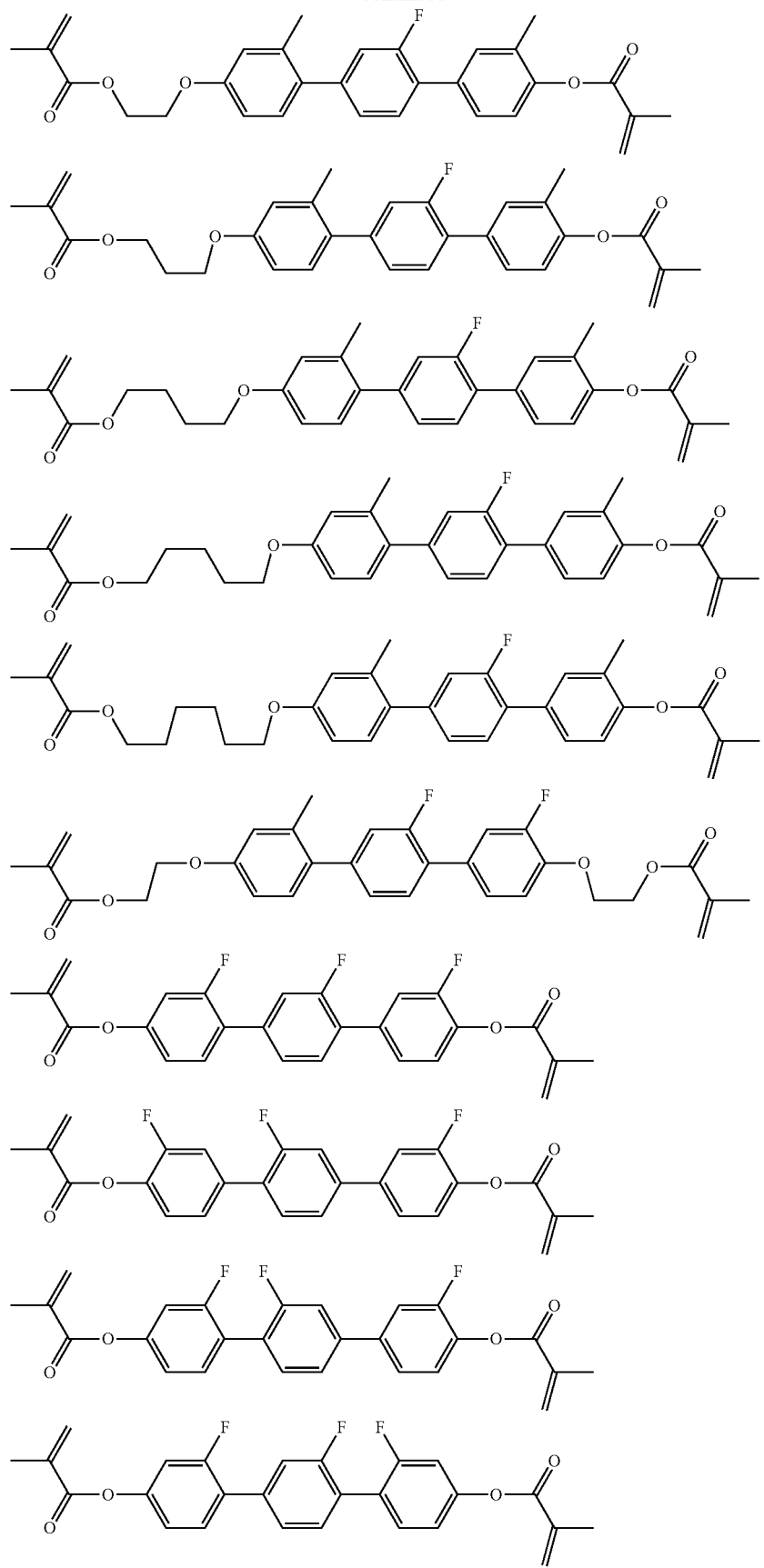

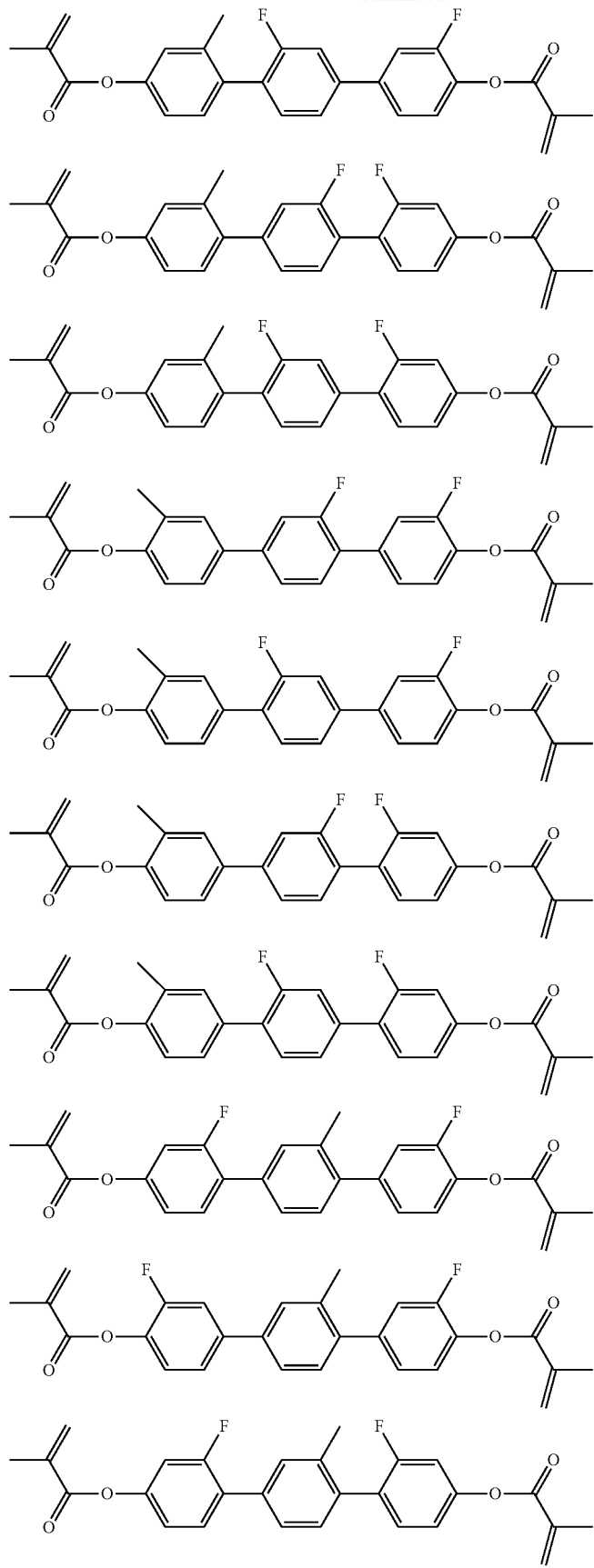

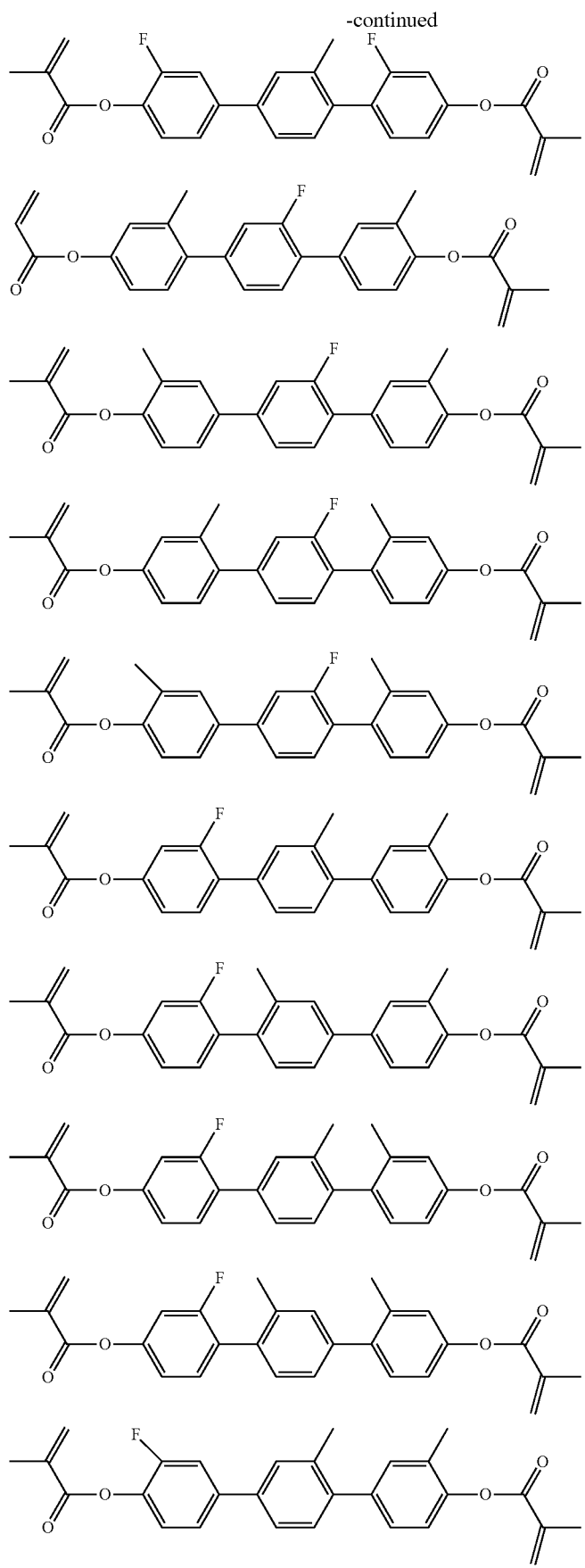

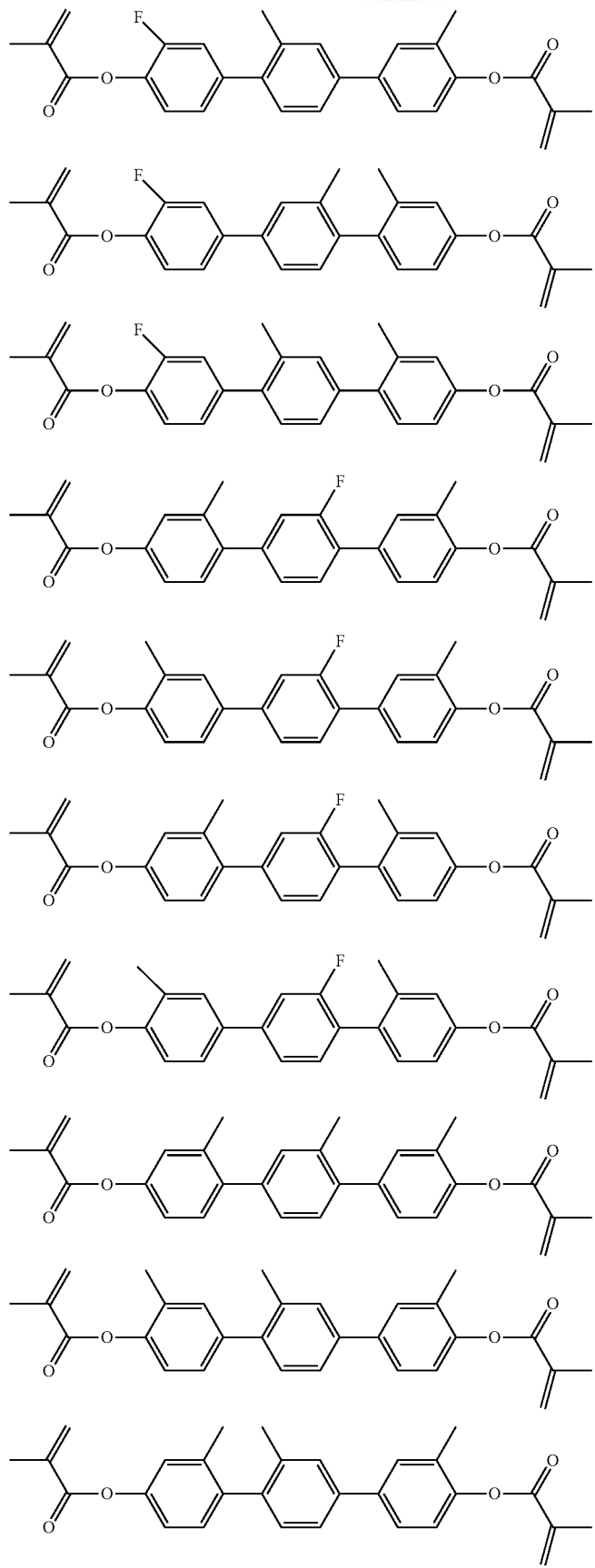

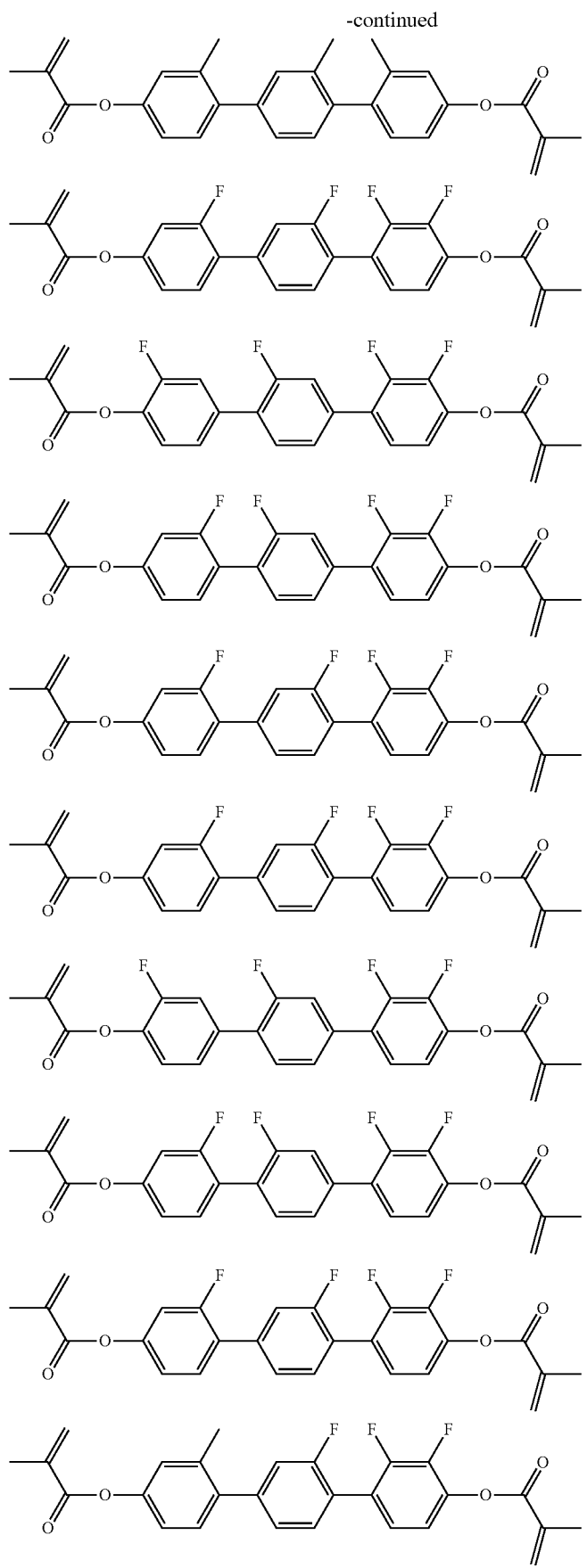

-continued
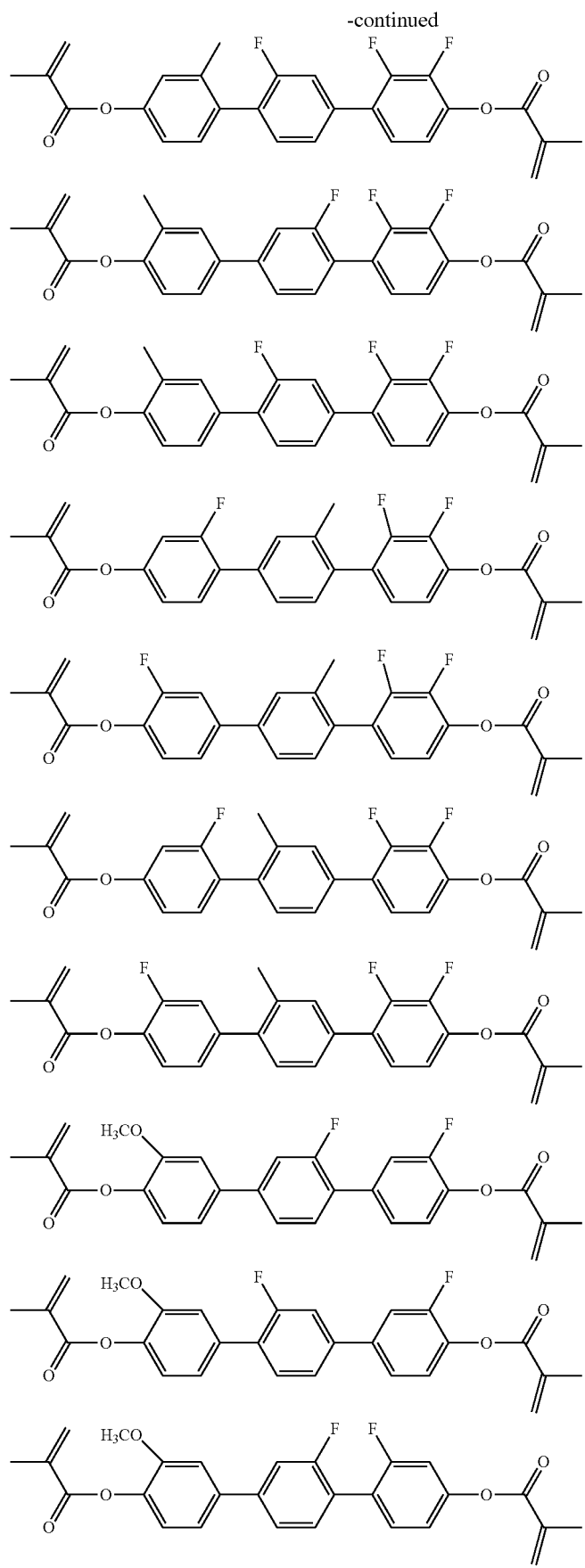

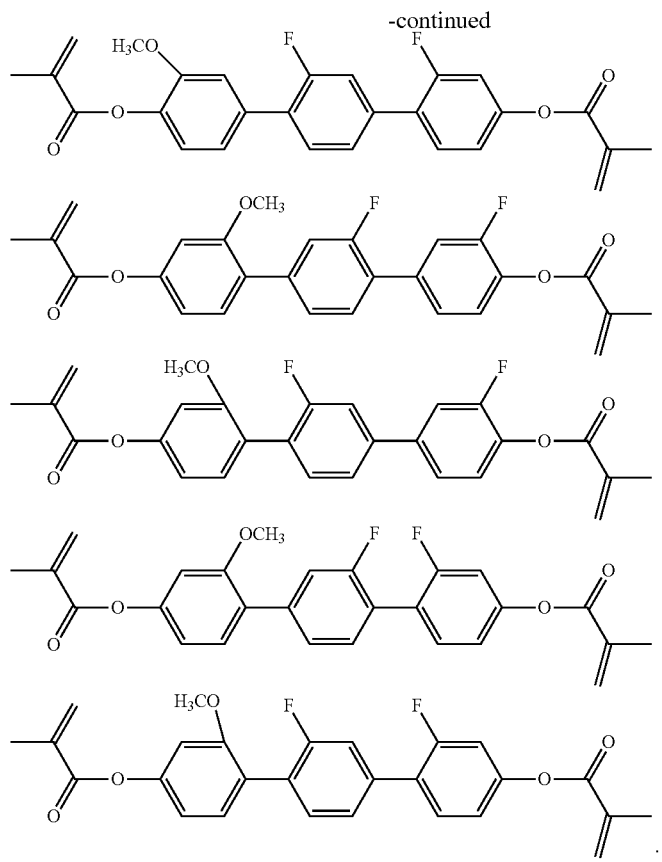

A second objective of the present invention is to set forth a method for preparing the polymerizable compound of general formula I.

A synthetic route of the polymerizable compound of general formula I is as follows.

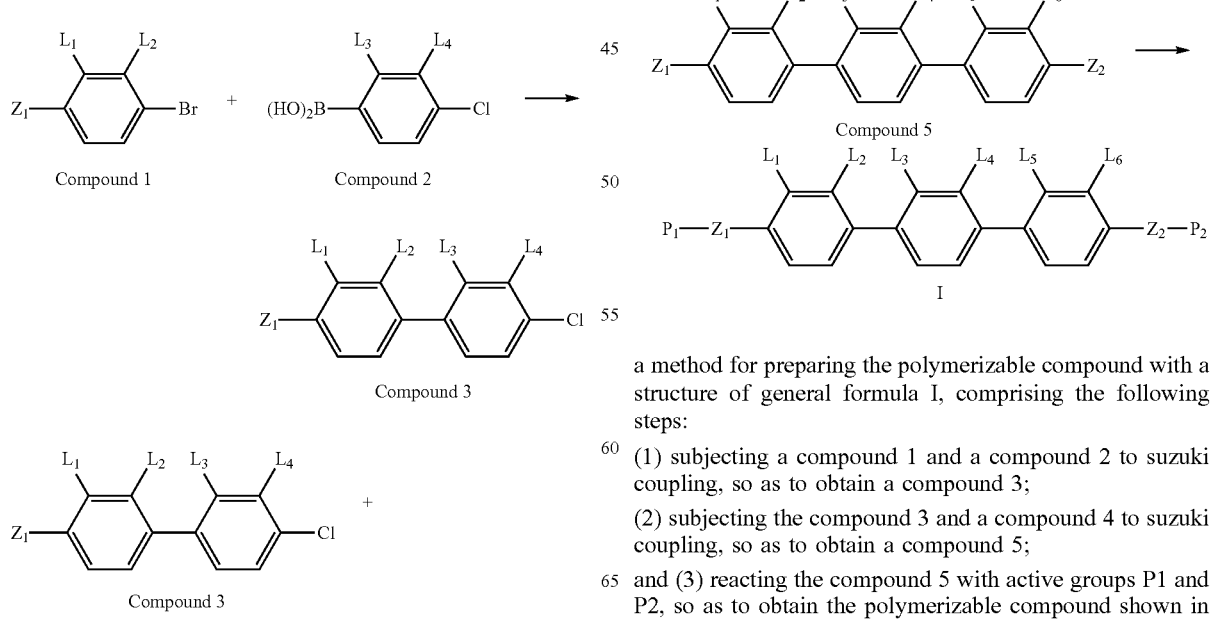

a method for preparing the polymerizable compound with a structure of general formula I, comprising the following steps:

(1) subjecting a compound 1 and a compound 2 to suzuki coupling, so as to obtain a compound 3;

(2) subjecting the compound 3 and a compound 4 to suzuki coupling, so as to obtain a compound 5;

and (3) reacting the compound 5 with active groups P1 and P2, so as to obtain the polymerizable compound shown in general formula I.

A third objective of the present invention is to set forth a liquid crystal composition containing the polymerizable compound shown in general formula I.

Preferably, the polymerizable compound in the liquid crystal composition has a mass fraction of 0.01-10%, further preferably 0.01-5%, and more preferably 0.1-3%.

Studies have shown that the liquid crystal composition containing the polymerizable compound of general formula I has a low viscosity, can achieve a fast response and also has moderate dielectric anisotropy Δε; a liquid crystal display element or a liquid crystal display comprising the liquid crystal composition has the properties of a wider nematic phase temperature range, an appropriate or a higher optical anisotropy Δn, a higher electrical resistivity, a good anti-ultraviolet performance, a high charge holding rate, a low vapor pressure, etc.

A fourth objective of the present invention is to set forth the use of the polymerizable compound of general formula I and the liquid crystal composition containing the polymerizable compound of general formula I in the filed of liquid crystal displays, and preferably in a liquid crystal display device. The liquid crystal display device includes, but is not limited to, a TN, ADS, VA, FFS, or IPS liquid crystal display, and particularly preferably, the liquid crystal display device is a PSVA liquid crystal display.

DETAILED DESCRIPTION OF EMBODIMENTS

The following examples are intended to illustrate the present invention, but not to limit the scope of the present invention, and other equivalent alternations or modifications made without departing from the spirit disclosed in the present invention shall fall within the scope of the claims.

Unless otherwise specified, the liquid crystal compounds used in the following examples can be synthesized by well-known methods or obtained from public commercial sources. These synthesis techniques are conventional, and the obtained liquid crystal compounds meet the standards of electronic compounds after test.

According to the conventional detection methods in the art, the performance parameters of the liquid crystal compounds are obtained by linear fitting, wherein the specific meanings of the performance parameters are as follows:

Δn represents optical anisotropy (25° C.);
Δε represents dielectric anisotropy (25° C., 1000 Hz);
γ1 represents rotational viscosity (mPa·s, 25° C.);
Cp represents the clearing point.

Example 1

The liquid crystal compound has a structural formula of:

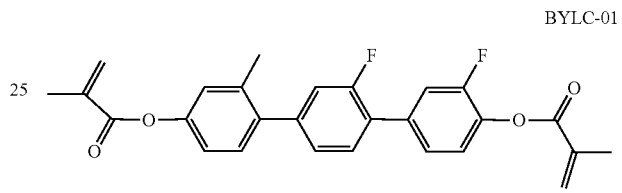

BYLC-01

The synthetic route to prepare compound BYLC-01 is shown below:

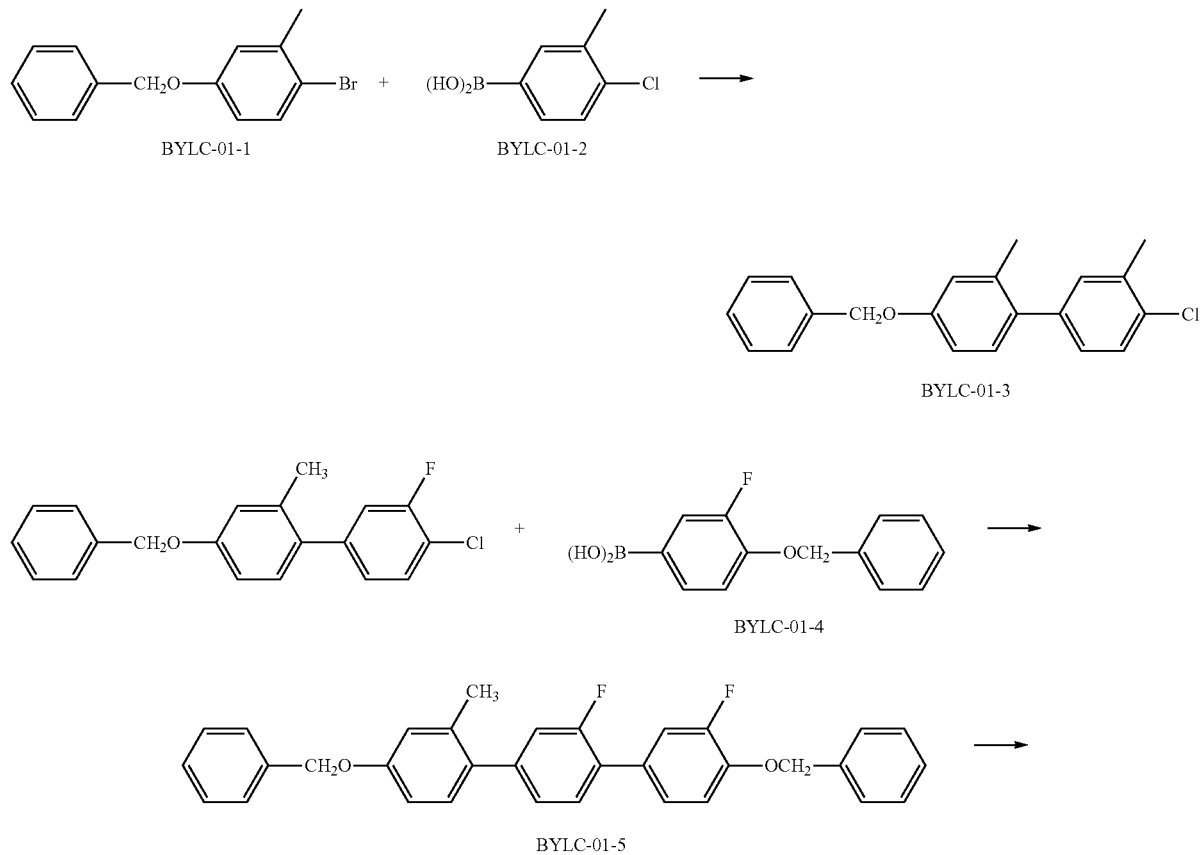

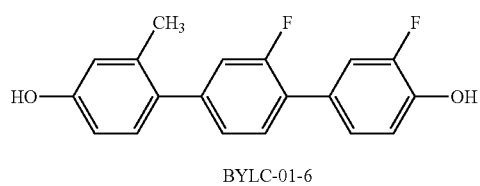
BYLC-01-6

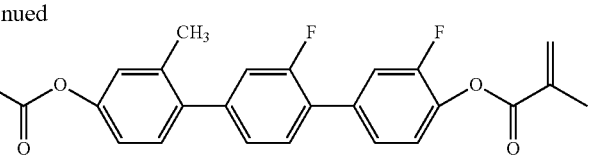
BYLC-01

The specific steps are as follows:

1. Synthesis of BYLC-01-3

83.1 g of BYLC-01-1, 62.8 g of BYLC-01-2, 200 ml of toluene, 100 ml of ethanol, 200 ml of water, and 62.1 g of potassium carbonate are charged into a clean 1 L three-necked flask and replaced with a certain amount of nitrogen; stirring is started and same is heated to between 50° C.-60° C. under the protection of nitrogen, then 1 g of tetrakis (triphenylphosphine) palladium is added, continuously heated to reflux, and reacted under continuous reflux for 3 hours;

post treatment: the reaction solution is added with 300 ml of toluene and 380 ml of water, stirred for 5 minutes, and subjected to liquid separation; the aqueous phase is extracted with 100 ml of toluene, the organic phases are combined and washed with 400 ml×2 of water twice. The combined organic phase passes through a column of 30 g silica gel+30 g alumina, the column is flushed with toluene at 3× column height, and the solvent is concentrated to dryness from the solution passing through the column in a water bath at 80° C.; then 2 times of ethanol+0.5 times of n-heptane are added for crystallization, frozen to below −15° C., filtered, sampled and detected by GC as 99.5%, and the wet weight of resulting yellow solid is 59 g.

Theoretical yield: 98 g; actual yield: 59 g; productive rate: 60%.

2. Synthesis of BYLC-01-5

32.6 g of BYLC-01-3, 25.8 g of BYLC-01-4, 27.6 g of potassium carbonate, 3.2 g of tetrabutylammonium bromide, 80 ml of dioxane, and 120 ml of water are charged into a clean 500 ml three-necked flask and replaced with nitrogen twice, then 0.03 g of tetrakis(triphenylphosphine)palladium is added, stirring is started and same is heated to reflux, and reacted under reflux for 3 hours; post treatment: the reaction solution is added with 300 ml of toluene, stirred for 5 minutes and subjected to liquid separation; the organic phase is washed with 300 ml×3 of hot water (about 60° C.) for 3 times, and passes through a column of 10 g alumina. The column is flushed with toluene at 2×column height, and the solution passing through the column is concentrated to 2 times of toluene; then 2 times of ethanol is added for crystallization, frozen under stirring to below −15° C. and filtered to obtain a white solid with a weight of 38 g, which is sampled and detected by HPLC as 98.6%.

Theoretical yield: 49.2 g; actual yield: 38 g; productive rate: 77%.

3. Synthesis of BYLC-01-6

38 g of BYLC-01-5, 100 ml of tetrahydrofuran, and 200 ml of toluene are charged into a 500 mL three-necked flask, stirring is started, and 3.8 g (wet weight) of palladium carbon and 10 ml of triethylamine are added and replaced with hydrogen three times; the temperature is controlled at 35° C.-45° C. for hydrogenation (obvious hydrogen absorption) until there is no obvious hydrogen adsorption, and the hydrogenation is lasted for 6 hours in total; post treatment: the reaction solution is subjected to suction filtration, the palladium carbon is washed with 100 ml of tetrahydrofuran, and the filtrate is concentrated in a water bath at 80° C. to dryness to obtain 24.1 g of product, which is sampled and detected by GC (Y4119121615) as 97.5%.

Theoretical yield: 24.1 g; actual yield: 24.1 g.

4. Synthesis of BYLC-01

Theoretical 24.1 g of BYLC-01, 100 ml of dichloromethane, 100 ml of tetrahydrofuran, and 100 ml of triethylamine are added into a clean and dry 500 mL three-necked flask and replaced with nitrogen, the temperature is controlled at 0° C.-15° C., methacryloyl chloride is added dropwise. After the dropwise addition is completed (a large number of white solids are formed during the dropwise addition), and the mixture is naturally cooled down and reacted for 3 hours (a room temperature of 11° C.), and sampled for detection.

Post treatment: the reaction solution is filtered, the solid is washed with 100 ml of dichloromethane, the combined filtrate is washed with 200 ml×3 of water twice to neutrality and passes through a column of 20 g silica gel. The column is flushed with dichloromethane at 2×column height (adding 0.1 g BHT before passing through the column), and the solution passing through the column is added with 0.1 g BHT, and concentrated in a water bath at 30° C. under reduced pressure to 60 g, which is then slowly poured into 200 ml of ethanol with stirring, stirred for 10 minutes (with some solids precipitated), frozen to −20° C.--30° C., and subjected to suction filtration to obtain a white solid product with a wet weight of 40 g. The solid product is added with 2 times of ethyl acetate and dissolved in water bath at 30° C., and 2 times of n-heptane is added, and the mixture passes through a column of 5 g silica gel (water bath at 30° C.). The column is flushed with ethyl acetate+n-heptane (ethyl acetate: n-heptane=1:1) at 2× column height, and the solution passing the column is directly frozen to −20° C.--30° C. and filtered, so as to obtain 16 g of white solid after the solvent is air-dried, with a yield of 46.2%, and HPLC 99.5%.

DSC: 93.09° C.-95.02° C., 101.49° C.-102.63° C., and 179.23° C.-179.41° C.

The obtained white solid BYLC-01 is analyzed by GC-MS, and the m/z of the product is 448.1 (M+).

Example 2

The liquid crystal compound has a structural formula of:

BYLC-02

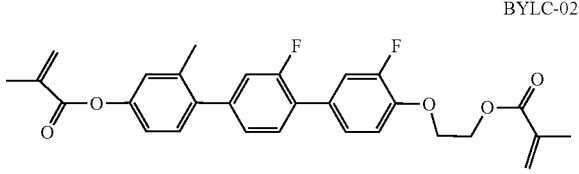 [SMILES: C=C(C)C(=O)OCCOc1ccc(-c2ccc(-c3ccc(OC(=O)C(=C)C)cc3C)cc2F)cc1F]

The obtained white solid BYLC-02 is analyzed by GC-MS, and the m/z of the product is 492.1 (M+).

Example 3

The liquid crystal compound has a structural formula of:

BYLC-03

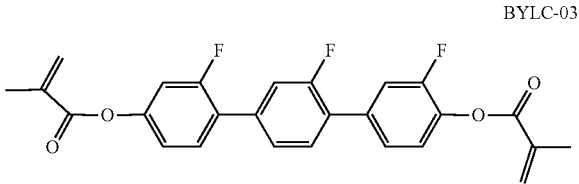 [SMILES: C=C(C)C(=O)Oc1ccc(-c2ccc(-c3ccc(OC(=O)C(=C)C)c(F)c3)c(F)c2)c(F)c1]

The obtained white solid BYLC-03 is analyzed by GC-MS, and the m/z of the product is 452.1 (M+).

Example 4

The liquid crystal compound has a structural formula of:

BYLC-04

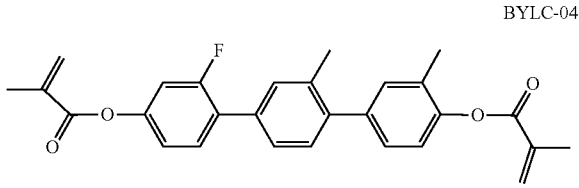 [SMILES: C=C(C)C(=O)Oc1ccc(-c2ccc(-c3ccc(OC(=O)C(=C)C)c(C)c3)c(C)c2)c(F)c1]

The obtained white solid BYLC-04 is analyzed by GC-MS, and the m/z of the product is 444.1 (M+).

COMPARATIVE EXAMPLE

RM-1

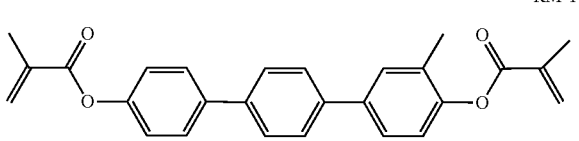

Performance Testing

The properties of the existing liquid crystal mixture BHR87800 (BaYi Space Liquid Crystal Technology Co., Ltd) are listed in Table 1:

TABLE 1

Summary table of properties of mixed crystals BHR87800

| | Property | | | | |
|---|---|---|---|---|---|
| | Cp | Δn | Δε | ε∥ | K3/K1 |
| Numerical value | +70° C. | 0.095 | −3.5 | 3.3 | 0.97 |

0.3% of polymerizable compound BYLC-04 provided in example 1 is added into 99.7% of liquid crystal composition BHR87800, and uniformly dissolved to obtain a mixture PM-1.

0.3% of polymerizable compound BYLC-04 provided in example 2 is added into 99.7% of liquid crystal composition BHR87800, and uniformly dissolved to obtain a mixture PM-2.

0.3% of polymerizable compound BYLC-03 provided in example 3 is added into 99.7% of liquid crystal composition BHR87800, and uniformly dissolved to obtain a mixture PM-3.

0.3% of polymerizable compound BYLC-04 provided in example 4 is added into 99.7% of liquid crystal composition BHR87800, and uniformly dissolved to obtain a mixture PM-4.

0.3% of polymerizable compound of RM-1 is added into 99.7% of liquid crystal composition BHR87800, and uniformly dissolved to obtain a mixture PM-5.

Results:

1. Physical properties: the physical properties of PM-1, PM-2, PM-3, PM-4, and PM-5 are almost the same as those of the existing liquid crystal mixture BHR87800.

2. Solubility: After the liquid crystal mixtures PM-1, PM-2, PM-3, and PM-4 of examples 1-4 are stored at 20° C. for 240 hours, the nematic phase liquid crystal state is maintained, and there is no precipitation of the polymerizable compound, which shows that the polymerizable compound of the present invention has good solubility.

3. Polymerization time and the residual amount of polymerizable compounds: PM-1, PM-2, PM-3, PM-4, and PM-5 are injected into a testing cassete with a gap of 4.0 μm and vertical alignment by using a vacuum infusion process. One side of the testing cassete is applied with square waves having a frequency of 60 HZ and a driving voltage of 16 V, and the other side is irradiated with ultraviolet by using a high pressure mercury UV lamp, where the irradiation intensity on the surface of the cassete is adjusted to 30 mW/cm$^2$ and the irradiation lasts for 15 min, 30 min, and 45 min, so as to obtain a polymerized vertically aligned liquid crystal display element; the testing cassete is then decomposed, and the residual polymerizable compound in the liquid crystal composition is determined by high performance liquid chromatography (HPLC). The results are summarized in Table 2.

TABLE 2

Data summary table of polymerizable compound residue

| UV Polymerization time (s) | PM-1 Polymer residue (%) | PM-2 Polymer residue (%) | PM-3 Polymer residue (%) | PM-4 Polymer residue (%) | PM-5 Polymer residue (%) |
|---|---|---|---|---|---|
| 0 | 0.30 | 0.30 | 0.30 | 0.30 | 0.30 |
| 15 min | 0.052 | 0.056 | 0.057 | 0.072 | 0.056 |
| 30 min | 0.0087 | 0.0087 | 0.0094 | 0.011 | 0.017 |

TABLE 2-continued

Data summary table of polymerizable compound residue

| UV Polymerization time (s) | PM-1 Polymer residue (%) | PM-2 Polymer residue (%) | PM-3 Polymer residue (%) | PM-4 Polymer residue (%) | PM-5 Polymer residue (%) |
|---|---|---|---|---|---|
| 45 min | Not detected | Not detected | Not detected | Not detected | 0.0053 |

It can be seen from Table 2 that the detection results of polymerizable compound residues of PM-1, PM-2, PM-3, and PM-4 show that no polymer residue is detected, while the polymerizable compound residue of PM-5 is 0.0053; this shows that the polymerizable compounds of the present invention have a higher degree of polymerization, such that the problem of poor display caused by impurities produced by polymerizable compound residues can be avoided. In addition, although the polymerization rate of PM-4 is slightly slower than that of PM-5 in the first 15 minutes, the polymerization rate increases significantly in the following 30 minutes. Therefore, from the overall point of view, the polymerization rates of PM-1, PM-2, PM-3 and PM-4 are better than that of PM-5, which could shorten the ultraviolet irradiation time.

In summary, the polymerizable compound of the present invention has the advantages of a better solubility, a faster polymerization rate, a more complete extent of polymerization, and less residues, thereby improving the problem of poor display to a great extent.

Although the present invention has been described in detail with general explanations, specific embodiments and tests, it is obvious to a person skilled in the art that some modifications or improvements can be made thereto based on the present invention. Therefore, all the modifications and improvements which can be made without departing from the spirit of the present invention belong to the scope of protection of the present invention.

INDUSTRIAL APPLICABILITY

The present invention provides a polymerizable compound, and a preparation method therefor and the use thereof. The polymerizable compound has a structure as shown in general formula I. Compared with the existing polymerizable RM, the polymerizable compound of the present invention has the advantages of a good solubility, a faster polymerization rate, a more complete extent of polymerization, and less residues, thereby improving the problem of poor display to a great extent and having good economic value and application prospect.

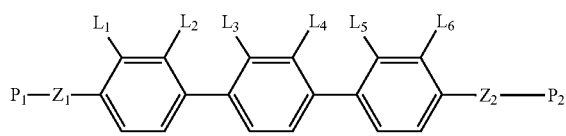

I

What is claimed is:

1. A polymerizable compound, wherein the polymerizable compound has a structure as shown in general formula I:

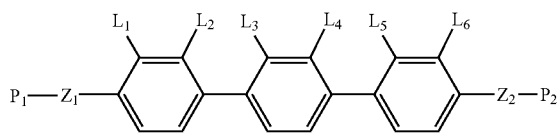

I wherein the $P_1$ and $P_2$ each independently represent an acrylate group, a methacrylate group, a fluoroacrylate group, a chloroacrylate group, an ethyleneoxy group, an oxetanyl group, or an epoxy group;

the $Z_1$ and $Z_2$ each independently represent a single bond, —O—, —S—, —CO—, —CO—O—, —O—CO—, —O—CO—O—, —CH=N—, —N=CH—, —N=N—, a $C_1$-$C_{12}$ alkylene group, or a $C_2$-$C_{12}$ alkenyl group, wherein one or more non-adjacent —CH$_2$— groups may each independently be replaced by —O—, —S—, —NH—, —CO—, COO—, —OCO—, —OCOO—, —SCO—, —COS— or —C=C— in a way that is not directly connected to each other;

$L_1$, $L_2$, $L_3$, $L_4$, $L_5$, and $L_6$ each independently represent H, —F, —Cl, CH$_3$, —C$_2$H$_5$, —OCH$_3$, —OC$_2$H$_5$, —CF$_3$ or OCF$_3$; and $L^1$ and $L_2$ are not both H; $L_3$ and $L_4$ are not both H; $L_5$ and $L_6$ are not both H.

2. The polymerizable compound according to claim 1, wherein $P_1$ and $P_2$ each independently represent a methacrylate group, an acrylate group, a fluoroacrylate group or a chloroacrylate group.

3. The polymerizable compound according to claim 2, wherein $P_1$ and $P_2$ each independently represent a methacrylate group or an acrylate group.

4. The polymerizable compound according to claim 1, wherein $Z_1$ and $Z_2$ each independently represent a single bond, —O—, —S—, —CO—O—, —O—CO—, a $C_1$-$C_6$ alkylene group, or a $C_2$-$C_6$ alkenyl group, wherein one or more non-adjacent —CH$_2$— groups may each independently be replaced by —O— in a way that is not directly connected to each other.

5. The polymerizable compound according to claim 4, wherein $Z_1$ and $Z_2$ each independently represent a single bond, —O—, a $C_1$-$C_6$ alkylene group or alkoxy group.

6. The polymerizable compound according to claim 1, wherein $L_1$, $L_2$, $L_3$, $L_4$, $L_5$, and $L_6$ each independently represent —F, —CH$_3$, or —OCH$_3$.

7. The polymerizable compound according to claim 1, wherein the polymerizable compound is selected from one of the following compounds:

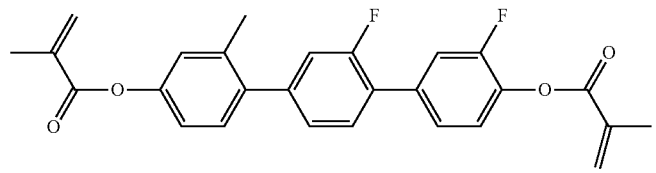

-continued
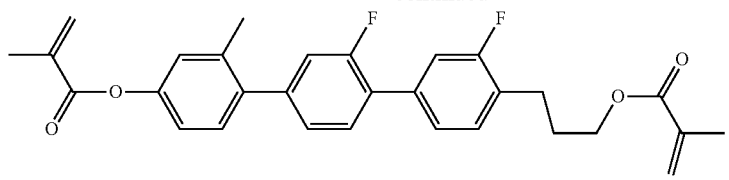
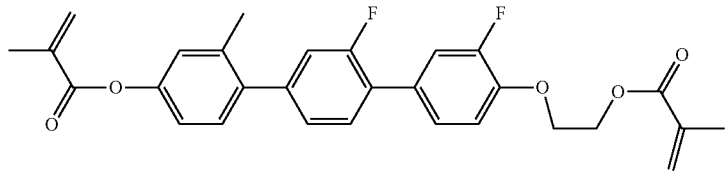
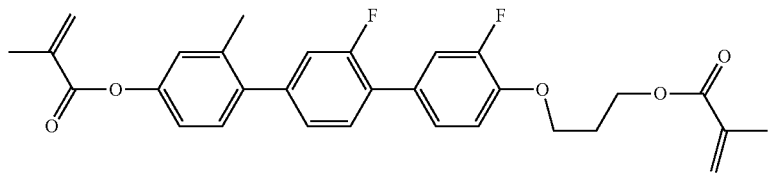
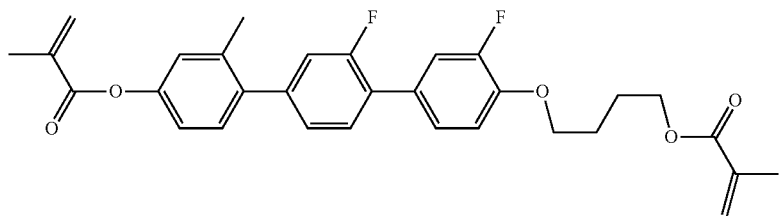
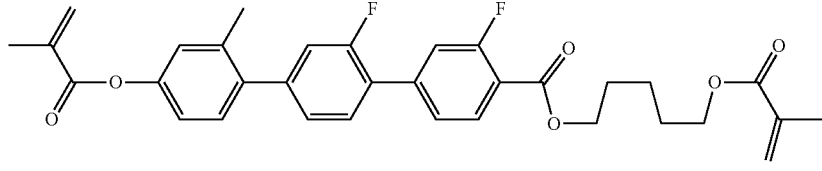
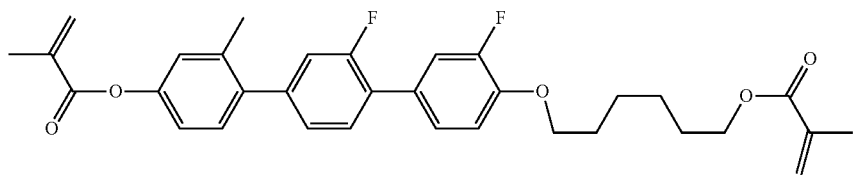
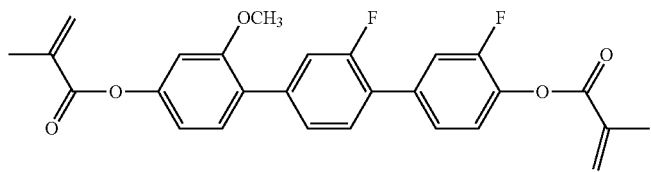
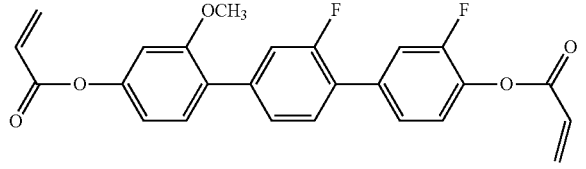
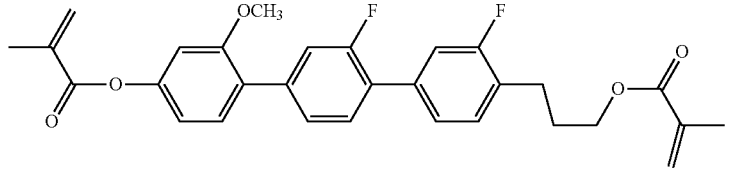

-continued
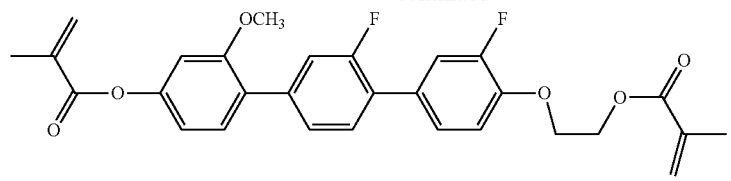
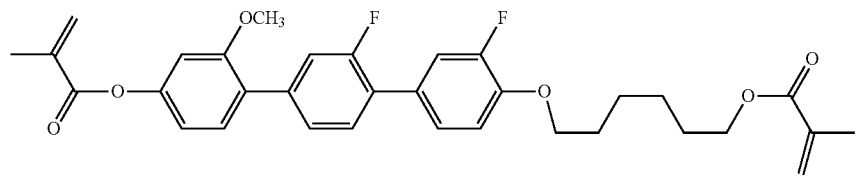
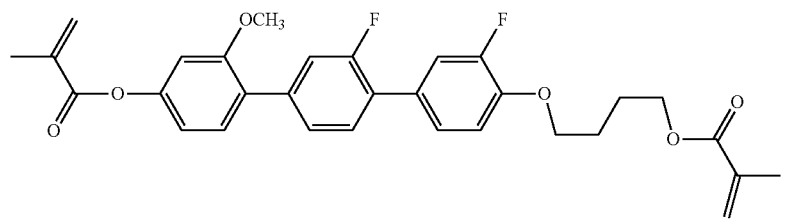
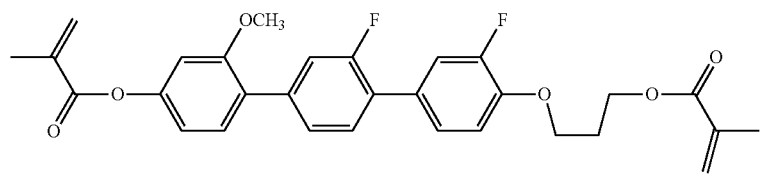
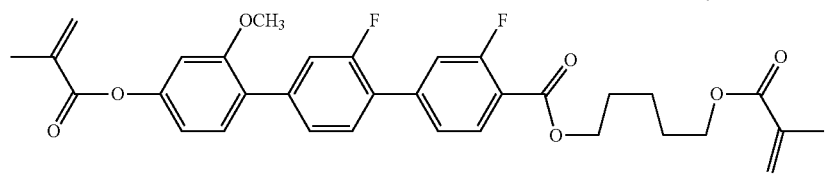
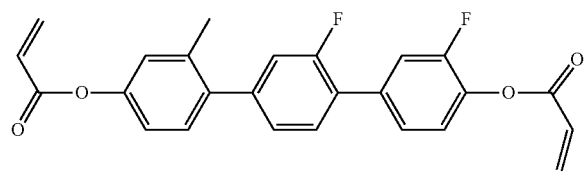
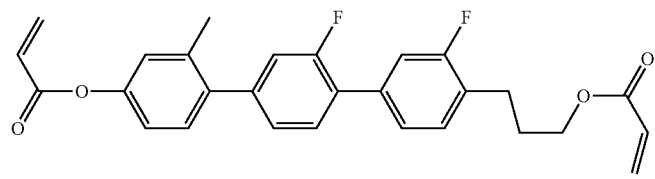
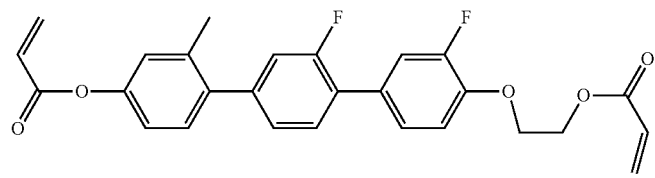
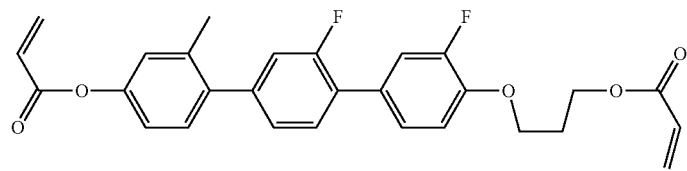

-continued
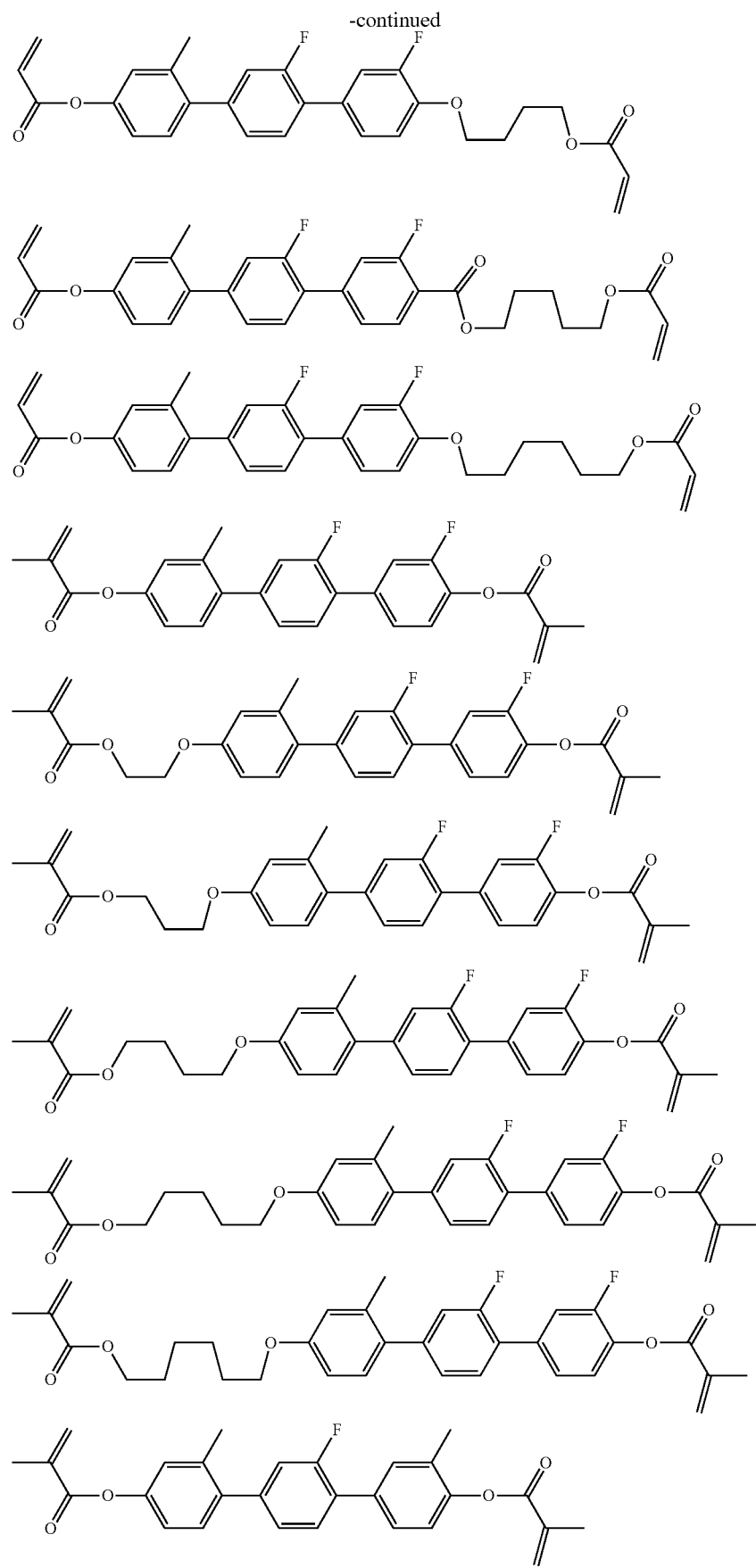

-continued
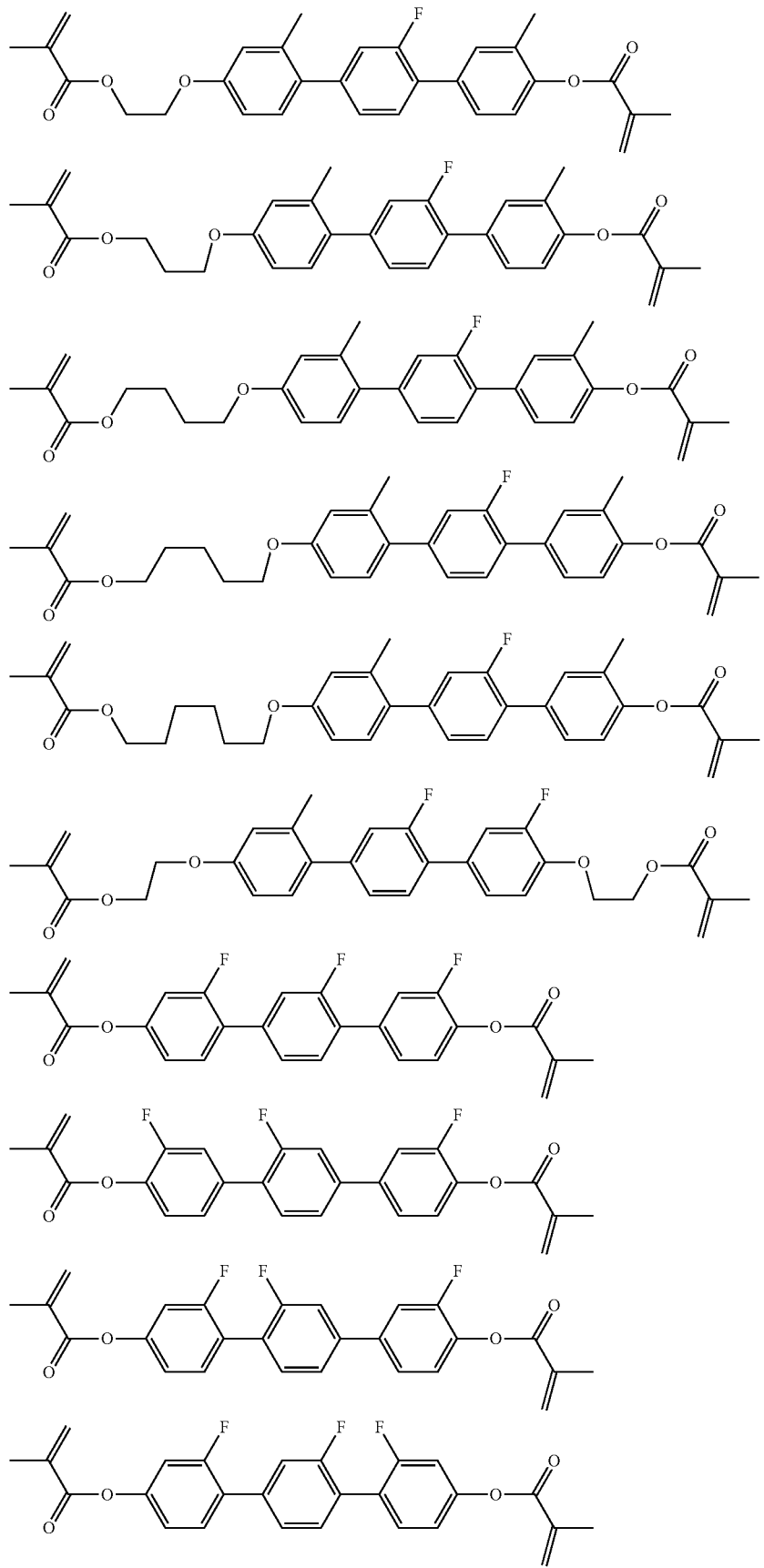

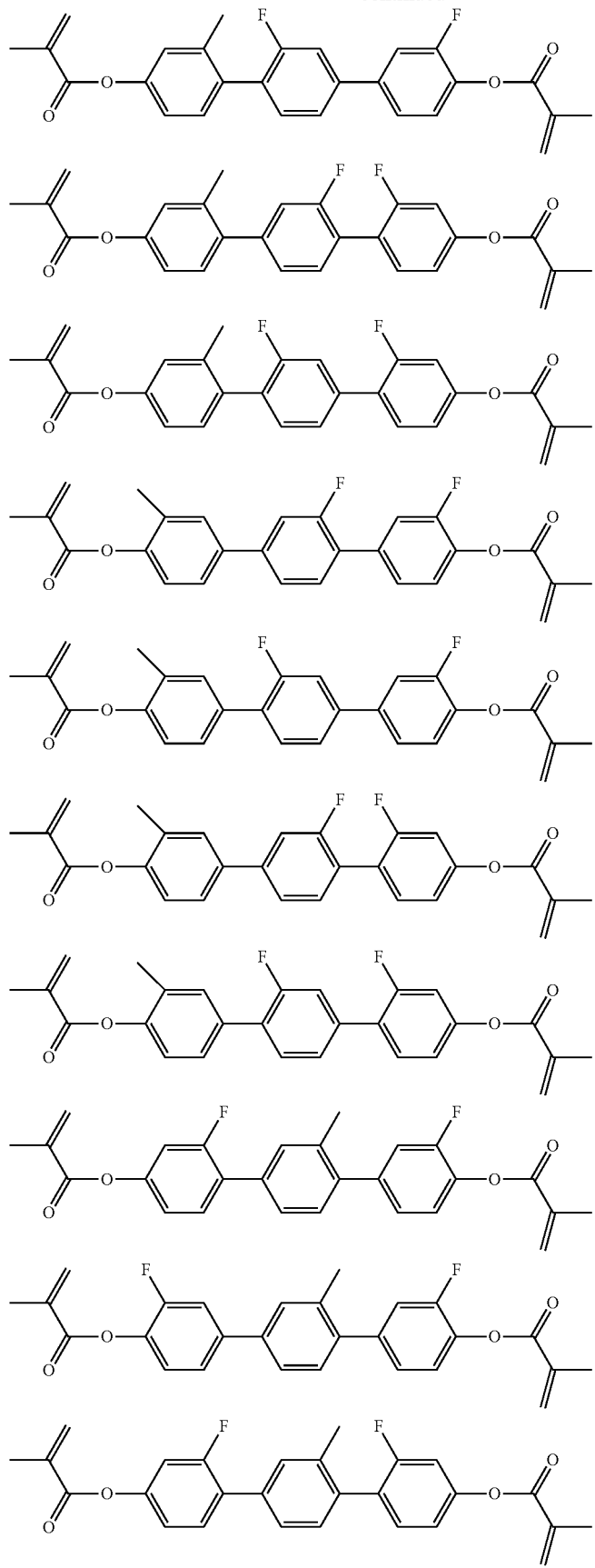

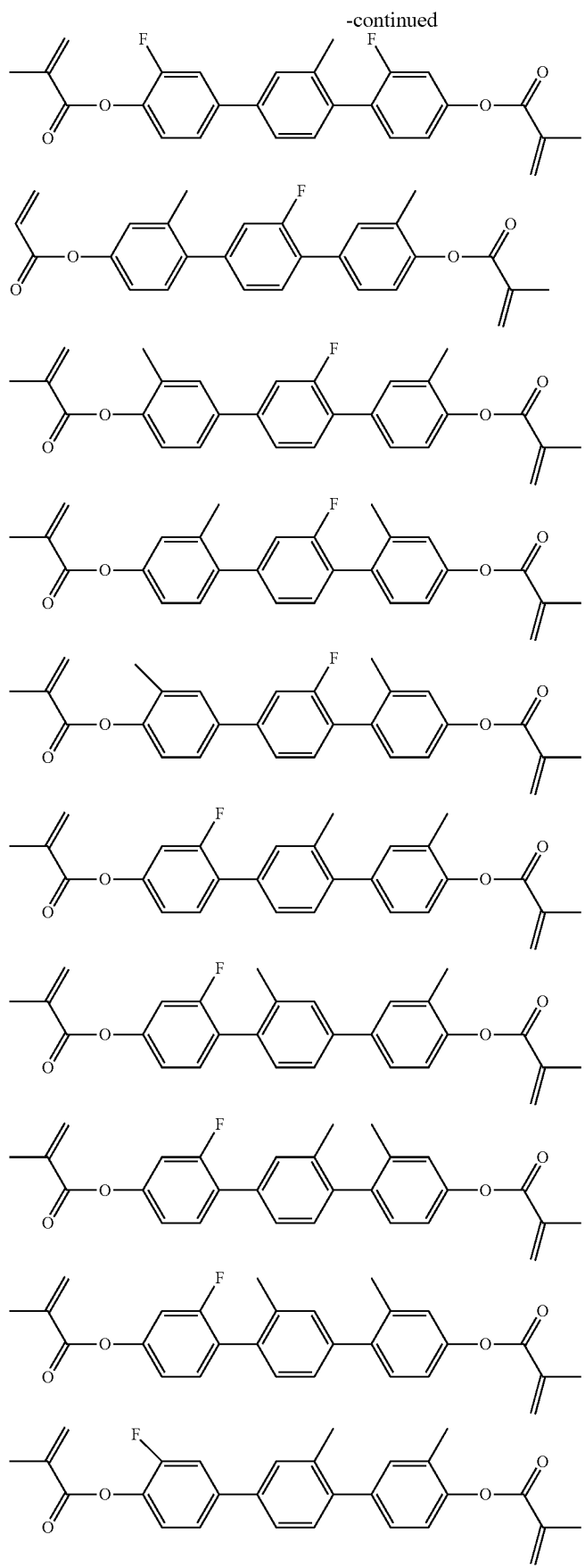

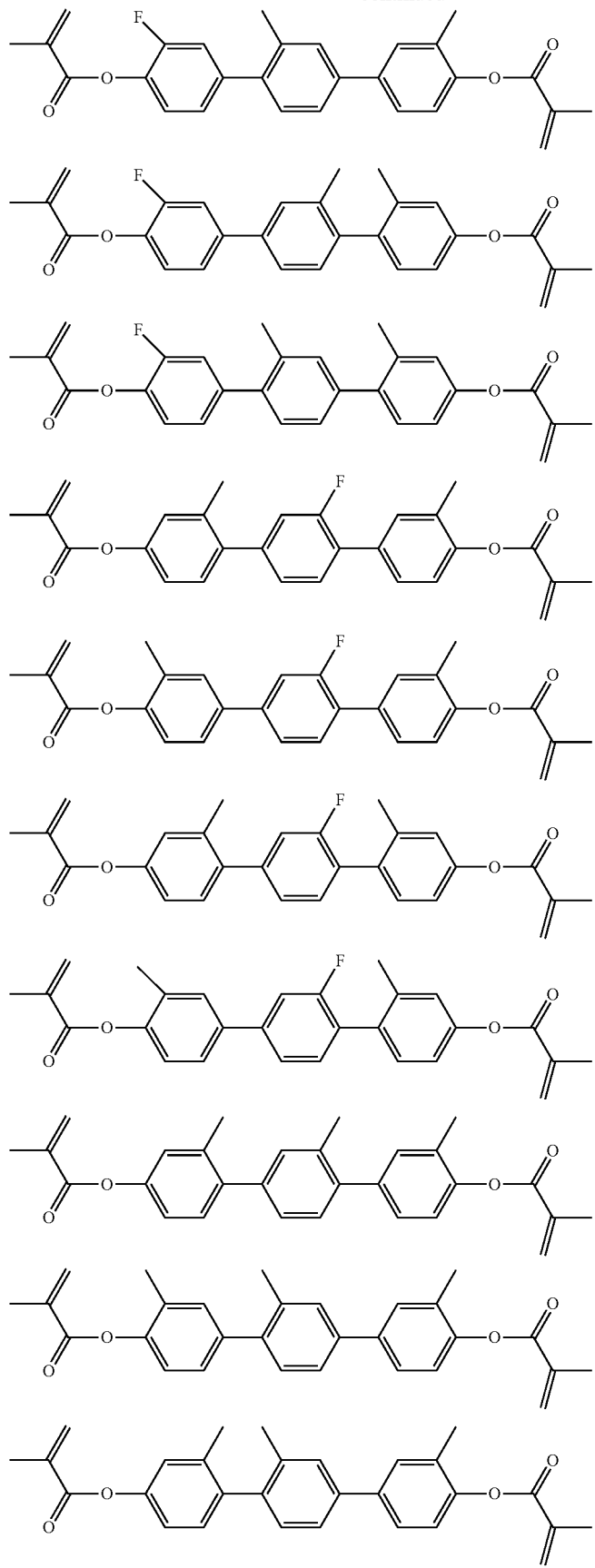

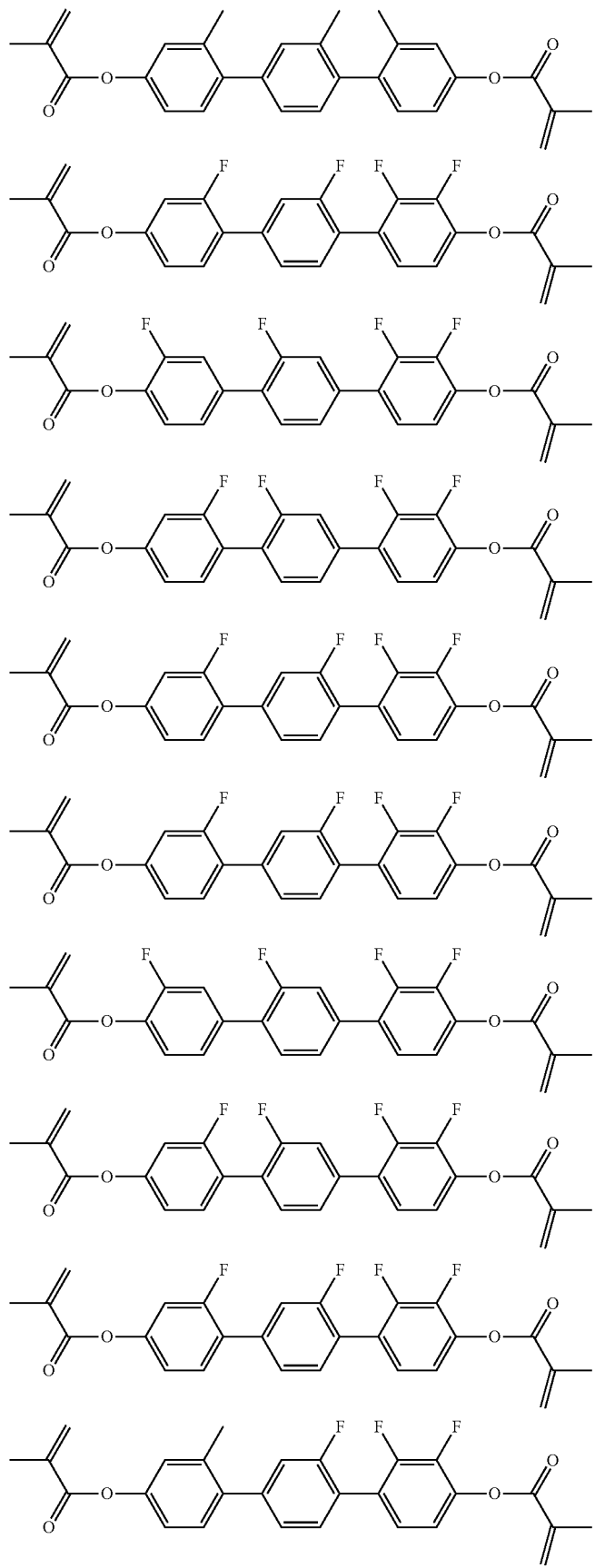

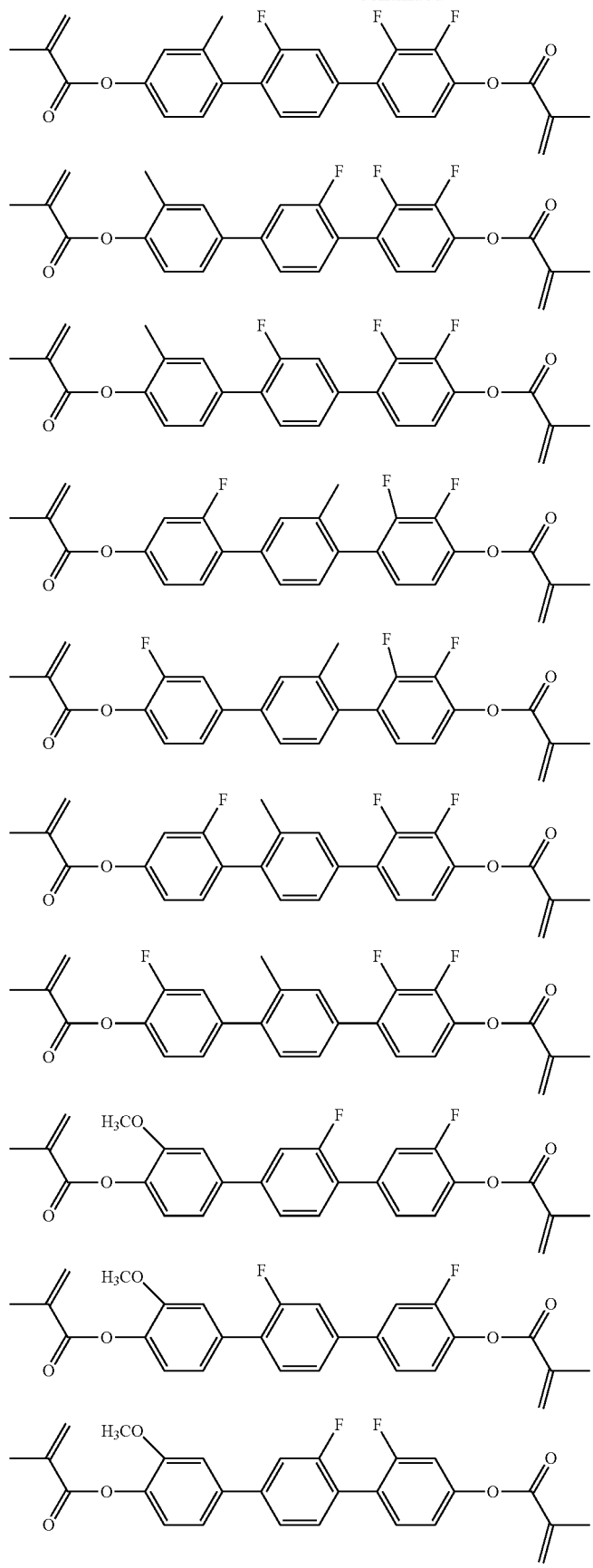

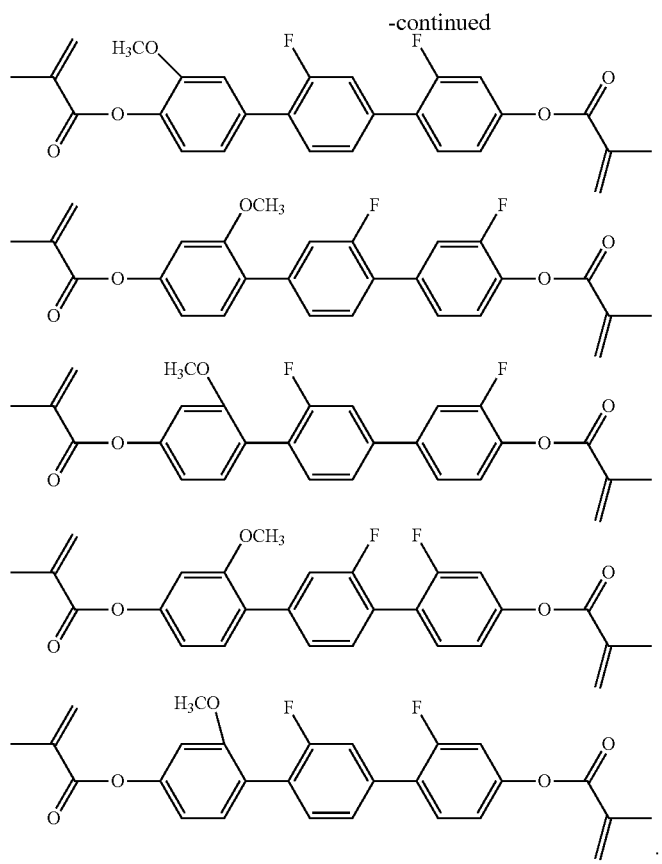

8. A method for preparing the polymerizable compound according to claim 1, wherein a synthetic route is as follows:

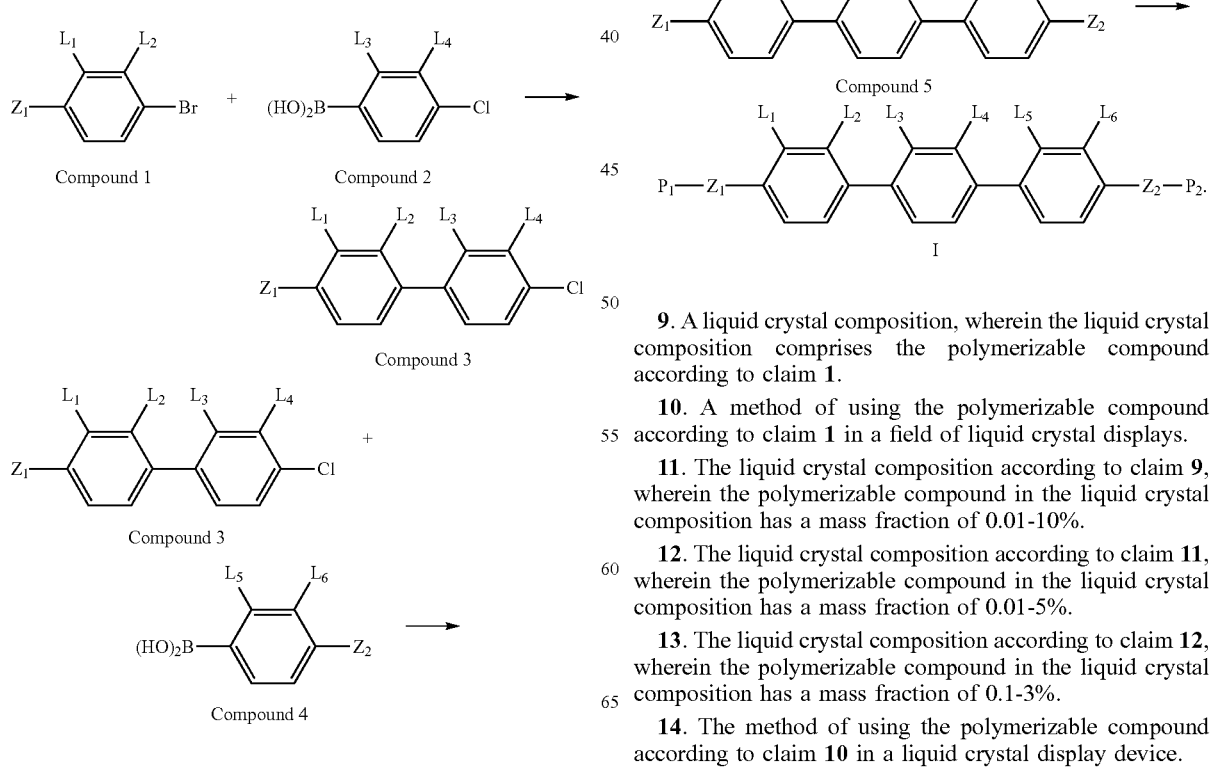

9. A liquid crystal composition, wherein the liquid crystal composition comprises the polymerizable compound according to claim 1.

10. A method of using the polymerizable compound according to claim 1 in a field of liquid crystal displays.

11. The liquid crystal composition according to claim 9, wherein the polymerizable compound in the liquid crystal composition has a mass fraction of 0.01-10%.

12. The liquid crystal composition according to claim 11, wherein the polymerizable compound in the liquid crystal composition has a mass fraction of 0.01-5%.

13. The liquid crystal composition according to claim 12, wherein the polymerizable compound in the liquid crystal composition has a mass fraction of 0.1-3%.

14. The method of using the polymerizable compound according to claim 10 in a liquid crystal display device.

15. The method of using the polymerizable compound according to claim 14, wherein the liquid crystal display device comprises a TN, ADS, VA, PSVA, FFS, or IPS liquid crystal display.

16. The method of using the liquid crystal composition according to claim 9 in a field of liquid crystal displays.

17. The method of using the liquid crystal composition according to claim 16 in a liquid crystal display device.

18. The method of using the liquid crystal composition according to claim 17, wherein the liquid crystal display device comprises a TN, ADS, VA, PSVA, FFS, or IPS liquid crystal display.

* * * * *